United States Patent [19]

Smith

[11] Patent Number: 5,054,802

[45] Date of Patent: Oct. 8, 1991

[54] BICYCLE FRAME

[75] Inventor: Stephen W. Smith, Bedford, Pa.

[73] Assignee: Hedstrom Corporation, Bedford, Pa.

[21] Appl. No.: 588,148

[22] Filed: Sep. 26, 1990

Related U.S. Application Data

[63] Continuation of Ser. No. 345,092, Apr. 28, 1989, abandoned.

[51] Int. Cl.[5] .............................................. B62K 19/18
[52] U.S. Cl. ................................. 280/279; 280/281.1;
280/288.3
[58] Field of Search ...................... 280/281.1, 279, 284,
280/288.1, 288, 288.3

[56]     References Cited
U.S. PATENT DOCUMENTS

| | | | |
|---|---|---|---|
| 2,495,859 | 1/1950 | Mennesson | 280/281.1 |
| 2,827,306 | 3/1958 | Roder | 280/288.7 |
| 3,030,124 | 4/1962 | Holloway | 403/169 |
| 4,046,396 | 9/1977 | Taylor et al. | 280/281.1 |
| 4,132,428 | 1/1979 | Lassiére | 280/281.1 |
| 4,768,798 | 9/1988 | Reed et al. | 280/281.1 |

FOREIGN PATENT DOCUMENTS 803512 4/1951 Fed. Rep. of Germany.
88491 3/1921 Switzerland ...................... 280/288.3

Primary Examiner—Charles A. Marmor
Assistant Examiner—Mitchell Bompey
Attorney, Agent, or Firm—Cesari and McKenna

[57]     ABSTRACT

A rugged but inexpensive bicycle frame comprises a tubular head post welded to the flattened forward end of a relatively large diameter tubular crossbar. The rear end of the crossbar is flattened laterally and provided with a concave rear edge. A tubular rear fork has a rounded bridge portion which is fitted to the crossbar rear edge so that the nominal plane of the rear fork is perpendicular to the headpost. Welds permanently connect the front and rear ends of the crossbar to the headpost and rear fork bridge portion respectively. There are openings in the top and bottom walls of the crossbar just forward of the rear end thereof for receiving a tubular seat post so that the lower end of set seat post extends appreciably below the crossbar. Welds permanently connect the seat post to the crossbar. A short tube is welded to the lower end of the seat post to support the pedal crank.

3 Claims, 1 Drawing Sheet

BICYCLE FRAME

RELATED APPLICATION

This application is a continuation of Ser. No. 345,092, filed Apr. 8, 1989, now abandoned.

FIELD OF THE INVENTION

This invention relates to children's bicycles. It relates more particularly to an improved bicycle frame which can be manufactured and assembled at a relatively low cost.

BACKGROUND OF THE INVENTION

Conventional frames for children's bicycles are composed of several elements some of which are tubular and some of which are flat metal straps or plates. All of these different parts must be welded together to form the frame so that the assembly of the frame is time consuming and costly. It would be desirable therefore to provide a bicycle frame construction which is composed of a minimum number of like parts so that the manufacture and the assembly of the frame can be accomplished at minimum cost.

SUMMARY OF THE INVENTION

The present invention aims to provide and improve frame construction for a children's bicycle.

Another object of the invention is to provide a bicycle frame which is composed in its entirety of metal tubes.

Another object of the invention is to provide a bicycle frame of this type which utilizes a minimum number of such tubes.

A further object of the invention is to provide a bicycle frame which is strong and light-weight.

Other objects will, in part, be obvious, will in part, appear hereinafter. The invention accordingly comprises the features of construction, combination of elements and arrangement of parts which will be exemplified in the following detailed description and in the scope the invention will be indicated in the claims.

The present bicycle frame is composed of only five different parts all of which are metal tubes. These parts consist of a relatively large tubular crossbar the forward end of which is flattened vertically so that it can be welded to a tubular headpost constituting a second component of the frame. The rear end of the crossbar is flattened laterally and welded to the bridge of a tubular U-shaped rear fork, the third frame component. The seatpost is also a tube which extends through more or less vertical holes in the crossbar and is welded in place there. The fifth and final component of the frame consists of a stub tube for supporting the pedal crank that is welded in place at the lower end of the seat post.

All five components of the frame comprise standard metal tubing which can be bent to shape and assembled at relatively low cost. Therefore a bicycle incorporating this frame can be made at minimum cost.

BRIEF DESCRIPTION OF THE DRAWING

For a fuller understanding of the nature and objects of the invention, reference should be had to the following detailed description, taken in connection with the accompanying drawing, in which.

DETAILED DESCRIPTION OF ILLUSTRATIVE EMBODIMENT

Figure 1:
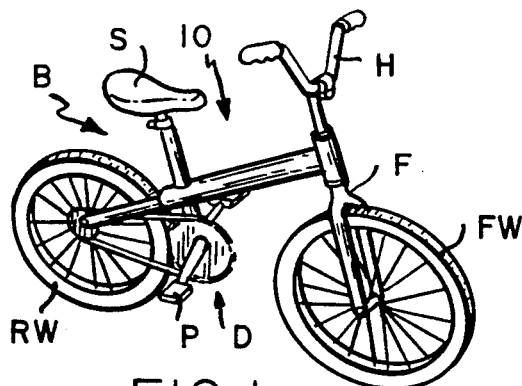
FIG. 1 is an isometric view of a children's bicycle having a frame made according to this invention.

Refer first to FIG. 1 which illustrates a bicycle B incorporating a frame shown generally 10 made in accordance with this invention. Supported by frame 10 is the usual front fork F having a front wheel FW at its lower end and a handlebar unit H at in its upper end, a seat S, a rear wheel RW which is rotated by a drive D including a pedal crank P.

Figure 2:
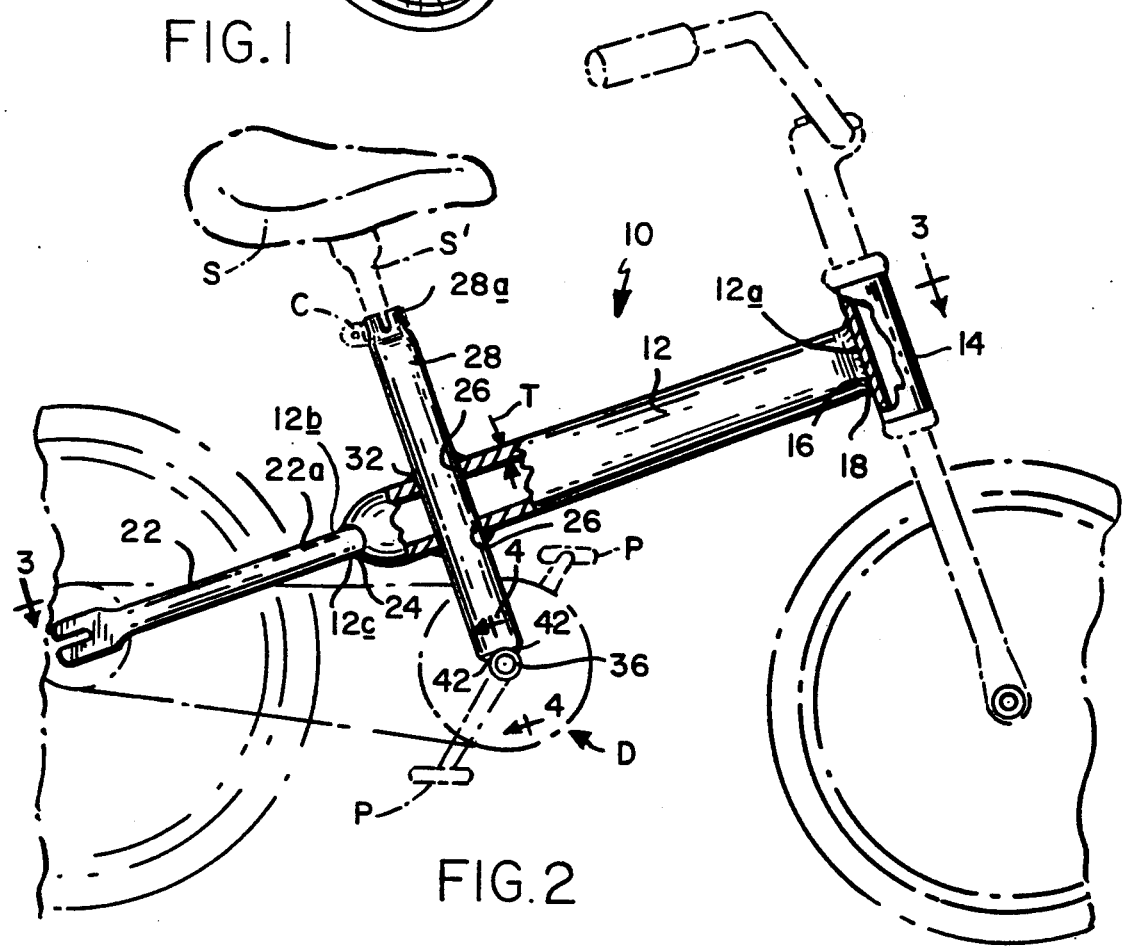
FIG. 2 is an elevational view with parts broken away on a much larger scale showing the FIG. 1 frame in greater detail.
Figure 3:
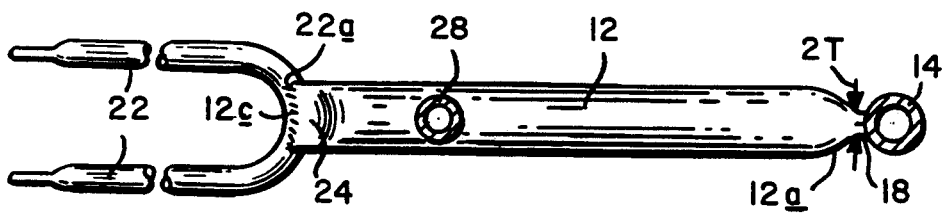
FIG. 3 is a sectional view along line 3—3 of FIG. 2.

Referring to now FIGS. 2 and 3, frame 10 is composed of only five tubular parts. More particularly, the frame includes a relatively large diameter tubular crossbar 12 whose forward end 12a is connected to a tubular headpost 14. For this, the crossbar forward end 12a is flattened vertically and welded to the rear wall of the headpost 14, those two parts being permanently connected together by welding 18 extending all around the flattened end 12a. Thus, the thickness at the forward end 12a of crossbar 12 is twice the wall thickness of the crossbar so that a strong stable connection between the crossbar and the headpost is assured.

The rear end 12b of crossbar 12 is flattened in the lateral direction and provided with curved rear edges 12c to fit the curved bridge 22a of a U-shaped tubular rear fork 22. The rear fork is permanently anchored to the crossbar end 12b by welding 24 at the boundary between the fork bridge 22a and the crossbar edge 12c. The rear ends 22b of fork 22 are flattened vertically and slotted to accept the axle of rear wheel RW.

Crossbar 12 is provided with registering holes 26a in its upper and lower walls just forward of its rear end 12b. These holes snugly receive a tubular seat post 28, permanent connections being provided between the seat post and the crossbar by weldings 32 all around holes 26.

The seat post upper end 28a is necked down and slotted longitudinally to accept the stem S' of seat S. The vertical position of the seat is preferably made adjustable by suitable means such as clamp C engaging around and clamping the slotted seat post end 28a.

Figure 4:
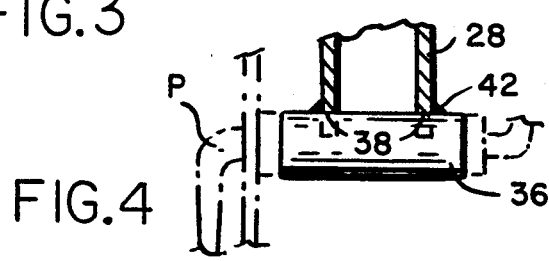
FIG. 4 is a sectional view taken along line 4—4 of FIG. 2.

The fifth and final component of frame 10 is a stub tube 36 to accommodate the pedal crank P. As best seen in FIG. 4, the stub tube 36 is welded at 42 to the lower end of the seat post.

When the tubular parts are all welded together as described, they form a frame 10 which is light-weight yet rugged and resistant to racking and bending. The remaining components of the bicycle B are assembled to frame 10 in the usual way either at the factory or at home by the customer who purchases the bicycle.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawing shall be interpreted as illustrative and not in a limiting sense.

It should also be understood that the following claims are intended to cover all of the generic and specific features of the invention herein described.

What is claimed is:

1. A children's bicycle frame composed essentially of only five tubes comprising an elongated relatively large diameter crossbar having walls, a front and a rear, the front of said crossbar being flattened to a vertical front end having a width that is twice the wall thickness of said crossbar, the rear end of said crossbar having upper and lower walls which are turned toward each other and shaped to form an inwardly curved horizontal rear end; a tubular headpost aligned with and abutting said crossbar front end; first weld means connecting said headpost and crossbar front end around said front end; a generally U-shaped tubular rear fork having rear ends and a rounded bridge end that has a smaller diameter than that of the crossbar and engaged from above and below by said crossbar rear end upper and lower walls and following the curve of those walls so that the plane of said rear fork is perpendicular to said headpost; second weld means connecting said rear end upper and lower walls of said crossbar to said rear fork bridge end; means defining registering openings in the top and bottom walls of said crossbar forward of the rear end of said crossbar; a tubular seat post having upper and lower ends and snugly received in said crossbar openings so that the lower end of said seat post extends appreciably below said crossbar; third weld means connecting said seat post to said crossbar around said crossbar openings; a short pedal crank tube positioned crosswise against the lower end of said seat post; and fourth weld means connecting said pedal tube and the lower end of said seat post.

2. The frame defined in claim 1 wherein an upper end segment of the seat post is necked down and slitted longitudinally for receiving a clamp.

3. The frame defined in claim 1 wherein the rear ends of said rear fork are flattened vertically and slotted.

* * * * *